UNITED STATES PATENT OFFICE.

DAVID GUDMIENE NICHOLS, OF COCHRAN, GEORGIA.

MEDICAL COMPOUND FOR ASTHMA, &c.

SPECIFICATION forming part of Letters Patent No. 374,491, dated December 6, 1887.

Application filed June 15, 1887. Serial No. 241,420. (Specimens.)

*To all whom it may concern:*

Be it known that I, DAVID GUDMIENE NICHOLS, of Cochran, in the county of Pulaski and State of Georgia, have invented certain new and useful Improvements in Medical Compounds; and I do hereby declare the following to be a full, clear, and exact description of the invention, such as will enable others skilled in the art to which it pertains to make and use it.

My invention relates to an improvement in medical compounds, and which is especially intended for the treatment of consumption, asthma, and hemorrhages of the lungs; and it consists in the following ingredients, combined in about the proportions hereinafter stated.

Comfrey-root, (*Symphytum officinalis,*) two ounces; holly-root bark, (*Ilex,*) two ounces; button-bush bark, (*Cephalanthus occidentalis,*) two ounces; mullein-tops, (*Verbascum thapsus,*) two ounces; Jerusalem oak bark, (*Chenopodium anthelminticum,*) two ounces; seneca snake-root, (*Polygala seneca,*) one ounce; honey, one quart; water, one gallon.

In preparing the above composition I boil all of the ingredients together except the honey, and boil down to one quart, then add the honey and boil until all the water is exhausted, when there will be one quart of the medicine remaining and which is ready for use.

The above composition is intended especially for the treatment of consumption, asthma, and hemorrhages.

The dose for an adult is one tablespoonful three times a day before meals.

The use of this medicine will give almost immediate relief in asthma and hemorrhages of the lungs, and the like.

Having thus described my invention, I claim—

A medical compound for the treatment of asthma, hemorrhages of the lungs, and consumption, consisting of comfrey-root, holly-root bark, button-bush bark, mullein-tops, Jerusalem oak bark, seneca snake-root, honey, and water, in or about the proportions specified.

In testimony whereof I affix my signature in presence of witnesses.

DAVID GUDMIENE NICHOLS.

Witnesses:
   CHARLES E. TAYLOR,
   JOHN M. BRITT,
   JOSEPH BURNS.